(12) United States Patent
Klomp (10) Patent No.: US 8,122,791 B2
(45) Date of Patent: Feb. 28, 2012

(54) THREE-WAY RATCHET DRIVE MECHANISM

(75) Inventor: Waltherus Christianus Klomp, Delta (CA)

(73) Assignee: Winsire Enterprises Corporation, New Westminster (CA)

( * ) Notice: Subject to any disclaimer, the term of this patent is extended or adjusted under 35 U.S.C. 154(b) by 370 days.

(21) Appl. No.: 12/224,129

(22) PCT Filed: Feb. 20, 2007

(86) PCT No.: PCT/CA2007/000265
§ 371 (c)(1),
(2), (4) Date: Aug. 10, 2009

(87) PCT Pub. No.: WO2007/095736
PCT Pub. Date: Aug. 30, 2007

(65) Prior Publication Data
US 2009/0301264 A1    Dec. 10, 2009

Related U.S. Application Data

(60) Provisional application No. 60/774,627, filed on Feb. 21, 2006.

(51) Int. Cl.
*B25B 13/46* (2006.01)
*F16D 41/16* (2006.01)
(52) U.S. Cl. ........................................ 81/63.1; 192/43.2
(58) Field of Classification Search ............. 81/60–63.2; 192/43.1, 43.2
See application file for complete search history.

(56) References Cited

U.S. PATENT DOCUMENTS

2,720,296 A    10/1955    Briglia
(Continued)

*Primary Examiner* — Hadi Shakeri
(74) *Attorney, Agent, or Firm* — Lance A. Turlock (57) ABSTRACT

A compact, three-way ratchet drive mechanism selectively enables ratcheting operation in a clockwise direction, or an anti-clockwise direction, or disables ratcheting behavior. The mechanism includes a ratchet housing, a drive shaft, a ratchet wheel, J-shaped pawls, and a coaxially fitted selector sleeve for selecting a desired mode of operation.

10 Claims, 6 Drawing Sheets

U.S. PATENT DOCUMENTS

| | | | |
|---|---|---|---|
| 4,427,100 A | 1/1984 | Rude et al. | |
| 4,621,718 A | 11/1986 | DeCarolis | |
| 5,573,093 A * | 11/1996 | Lee | 81/63.1 |
| 5,613,585 A | 3/1997 | Tiede | |
| 5,685,204 A | 11/1997 | Braun | |
| 5,749,272 A | 5/1998 | Phan | |
| 6,047,801 A | 4/2000 | Liao | |
| 6,059,083 A * | 5/2000 | Tseng | 81/62 |
| 6,151,995 A | 11/2000 | Shu | |
| 6,250,183 B1 * | 6/2001 | Chiang | 81/63.1 |
| 6,272,952 B1 | 8/2001 | Hsu et al. | |
| 6,293,173 B1 | 9/2001 | Rowlay | |
| 6,305,248 B1 | 10/2001 | Rowlay | |
| 6,370,988 B1 | 4/2002 | Thompson et al. | |
| 6,450,312 B1 | 9/2002 | Hsiao | |
| 6,568,693 B2 * | 5/2003 | Glass | 81/63.1 |
| 6,854,363 B2 | 2/2005 | Ping | |
| 2008/0092695 A1 * | 4/2008 | Hernandez | 81/63.1 |

* cited by examiner

THREE-WAY RATCHET DRIVE MECHANISM

CROSS-REFERENCE TO RELATED APPLICATIONS

This application is related to U.S. provisional application No. 60/774,627 filed Feb. 21, 2006, entitled "Three-Way Ratchet Tool Mechanism", naming Waltherus Christianus Klomp as the inventor. The contents of the provisional application are incorporated herein by reference in their entirety, and the benefit of the filing date of the provisional application is hereby claimed for all purposes that are legally served by such claim for the benefit of the filing date.

BACKGROUND OF THE INVENTION

The present invention relates to a ratchet drive mechanism for a screwdriver bit or other work tool.

There are a wide variety of known designs for ratchet tools. Typically, such tools have two modes of operation, either one of which may be selectively set by the user. In the first mode (for example to tighten a screw) ratcheting operation is enabled in a clockwise direction. In the second mode (for example to loosen a screw) ratcheting operation is enabled in an anti-clockwise direction.

However, disadvantageously, many of such tools typically have no third or non-ratcheting mode of operation or setting where ratcheting behaviour can be locked out/disabled and the drive mechanism of the tool engages whether the tool is turned clockwise or anti-clockwise. The advantage of such a third mode can arise, for example, when a user wants to make minor adjustments to the tightness of a screw or to slightly loosen then retighten a screw. In this situation, it can be quite inconvenient to have to switch back and forth between clockwise and anti-clockwise modes of ratcheting operation.

There are at least some ratcheting tools which offer a non-ratcheting mode of operation. An example is that described in U.S. Pat. No. 6,305,248 (Rowlay) granted on Oct. 23, 2001. In this patent, one stated object is to provide a ratchet mechanism which is of short length. It appears to be suggested that this object is compromised by conventional drive mechanisms where pawls extend in the axial direction of a shaft. This is agreed. But, the alternative mechanism suggested by Rowlay appears to be a rather complicated pawl rocking mechanism. Further, the Rowlay mechanism does not appear to combine the objective of short length with strength and long term durability.

Those relatively few tools which do offer a non-ratcheting mode of operation, are considered relatively complex in structure or operation. Further, they are not considered well adapted for smooth ratcheting operation under high torque loads or to resist side forces or impacts on the drive shaft of the ratchet drive mechanism or on a screwdriver bit or other work tool carried by the drive shaft.

SUMMARY OF THE INVENTION

The present invention provides a three-way ratchet drive mechanism which not only may be set, selectively, to enable ratcheting operation in a clockwise direction, or to enable ratcheting operation in an anti-clockwise direction, but also to enable non-ratcheting operation where ratcheting behaviour is locked out and disabled and the drive mechanism engages whether the tool is turned clockwise or anti-clockwise.

In a broad aspect of the present invention, there is provided a three-way ratchet drive mechanism for a work tool which mechanism is settable, selectively, to a desired one of three modes of operation, namely, a first mode of operation where ratcheting operation is enabled in a clockwise direction, a second mode of operation where ratcheting operation is enabled in an anti-clockwise direction, or a third mode of operation where the drive mechanism is locked and ratcheting operation is disabled. The mechanism comprises:

(a) a ratchet housing, the housing including a guide tube formed in the housing;

(b) a drive shaft extending longitudinally from a proximal end of a first end portion of the shaft to a distal end of a second end portion of the shaft, the first end portion of the shaft extending into the guide tube, the guide tube being sized for providing lateral bearing support to the first end portion of the shaft;

(c) a ratchet wheel coaxially fitted within the housing to the first end portion of the shaft in a position above the guide tube;

(d) a pawl spring retained within the housing, the spring having first and second spring arms;

(e) opposed first and second J-shaped ratchet pawls mounted within the housing, each pawl being biased by an associated one of the spring arms substantially linearly towards a position of engagement with the ratchet wheel such that:

if both pawls are in positions of engagement with the ratchet wheel, then ratcheting operation is disabled;

else, if only the first pawl is in a position of engagement with the ratchet wheel, then ratcheting operation is enabled in a first rotational direction;

else, if only the second pawl is in a position of engagement with the ratchet wheel, then operation is enabled in a second rotational direction opposite to the first direction.

(f) a selector sleeve coaxially fitted from over the top of the housing for rotational movement relative to the housing in directions corresponding to the first and second rotational directions, the sleeve including first and second tabs projecting into the housing, the first tab being positioned to engage and forcibly push the first pawl substantially linearly away from engagement with the ratchet wheel when the sleeve is rotated against the bias of the first spring arm;

the second tab being positioned to engage and forcibly push the second pawl substantially linearly away from engagement with the ratchet wheel when the sleeve is rotated against the bias of the second spring arm;

and, (g) selector sleeve retaining means for retaining the selector sleeve in a rotational position relative to the housing which corresponds to a desired one of the three modes of operation.

With the selector sleeve fitting over the top of the housing and the ratchet wheel, J-shaped ratchet pawls and pawl spring mounted within the housing, the overall length of the sleeve and housing may be made very compact. The first and seconds tabs of the selector sleeve provide for a positive, reliable control which acts directly on the pawls against the bias of the pawl spring.

Advantageously, the foregoing ratchet drive mechanism includes a bearing sleeve axially aligned with and longitudinally spaced from the guide tube. The bearing sleeve is sized for providing lateral bearing support to the second end portion of the drive shaft. The bearing sleeve is fitted to the housing and, for compactness, is fitted to the housing within the selector sleeve.

To further advantage, particularly to enable ease of rotation of the drive shaft, the foregoing ratchet drive mechanism may include a shaft bearing abutting the proximal end of the drive shaft.

To still further advantage, the drive shaft may have a radially stepped cylindrical configuration, the first end portion of the shaft having a diameter less than the diameter of the second end portion of the shaft. For a drive shaft where the second end portion has a given diameter, the smaller diameter of the first end portion allows for more room within the housing for the positioning of the ratchet wheel and other elements.

In one embodiment of the present invention, the selector sleeve retaining means comprises:
(a) circumferentially spaced recesses located in an inner wall of the selector sleeve, each of the recesses being associated with a unique one of the three modes of operation;
(b) a selector ball; and,
(c) a selector spring seated in a recess in the housing for urging the selector ball into a selected one the recesses.

In another embodiment of the present invention
(a) the pawl spring is a compression spring retained within the housing by a retaining clip which has an opening through which a central main body portion of the pawl spring is outwardly urged by the pawl spring; and,
(b) the selector sleeve retaining means comprises circumferentially spaced recesses located in an inner wall of the selector sleeve, each of the recesses being associated with a unique one of the three modes of operation, and each being sized to engage the main body portion of the pawl spring depending on the selected mode of operation.

In the foregoing embodiment, it will be appreciated that the pawl spring performs not only the function of biasing the pawls but also the function of the selector ball and selector spring in the immediate previously described embodiment.

To further advantage, the lower part of a drive mechanism in accordance with the present invention may include differently sized splines adapted to engage a screwdriver handle when press fitted to the mechanism. As discussed below, this is a commercially practical feature which better enables the proper alignment of any desired trade marks or other identifying indicia.

The invention will now be described with reference to the drawings wherein:

DETAILED DESCRIPTION

In the description which follows, two primary embodiments of the present invention are described. In the course of the description, reference is made to the material composition of various parts. While these materials are preferred at the present time, it will be understood by those skilled in the art that other materials obviously could be substituted. The materials mentioned are not considered essential to the invention.

First Embodiment

Referring now to FIGS. 1-12, there is shown a ratchet drive mechanism generally designated 1 for a work tool such as a screwdriver bit (not shown). Drive mechanism 1 includes a die cast aluminum ratchet housing generally designated 5, a generally cylindrical steel drive shaft 20 extending from a relatively small diameter proximal end 21 of end portion 22 of the shaft to a relatively large diameter distal end 29 of end portion 28 of the shaft, an annular plastic bearing sleeve 30 fitted to the housing, a steel spline or ratchet wheel 40 which is coaxially press fitted on end portion 22 of shaft 20, a resilient plastic selector sleeve generally designated 50, a pair of J-shaped steel ratchet pawls 60a, 60b which are of substantially the same size, and a plastic retaining clip 70. As well, drive mechanism 1 includes an inner steel coil spring 90, a steel selector spring 95, a steel selector ball 97, and a steel shaft bearing 98, the latter of which is a seated in a recess 7 formed in housing 5 at the bottom of guide tube 8 also formed in housing 5. Guide tube 8 and bearing sleeve 30 are in axial alignment. Shaft bearing 98 abuts proximal end 21 of shaft 20 on the longitudinal axis of the shaft. While not considered essential, it advantageously enables easier rotation of the shaft when compression forces are acting on the shaft.

Shaft 20 includes a socket 23 which is sized to receive and magnetically hold a conventional screwdriver bit or other work tool (not shown). Between end portions 22, 28, shaft 20 includes a stepped cylindrical portion 25 against which ratchet wheel 40 abuts. Significantly, it will be noted that shaft 20 is supported not only longitudinally by shaft bearing 98 but also laterally at longitudinally spaced locations by bearing sleeve 30 and guide tube 8. The inner cylindrical wall of guide tube 8 is sized for providing lateral bearing support to the first end portion 22 of shaft 20. The inner cylindrical wall 35 of bearing sleeve 30 is sized for providing lateral bearing support to the second end portion of shaft 20. Such lateral support enables shaft 20 to better resist side forces and impacts on the shaft or on a work tool carried by the shaft.

Housing 5 is configured and selector sleeve 50 is cooperatively configured to enable the sleeve to be coaxially snap-fitted over the housing. More particularly, housing 5 includes a downwardly and outwardly tapered portion 10 which merges with a radially inwardly extending annular channel 11. Radially inwardly extending tabs 51 of selector sleeve 50 engage housing 5 in channel 11, the engagement being enabled because selector sleeve 50 resiliently flexes outwardly as tabs 51 ride down on tapered portion 10 toward channel 11. The engagement is sufficiently loose to permit easy rotation of the selector sleeve relative to the housing.

The lower part of housing 5 includes wings or splines 12, 13 and barbs 14 to engage a screwdriver handle (not shown) when press fitted onto the housing. It will be noted that splines 12 and 13 are of differing dimensions. Spline 12 is shorter than spline 13. As well (although not readily apparent from the drawings), spline 12 is narrower than spline 13. These features are considered to be advantageous because they allow the handle to be coupled to the housing in only one angular position of the handle relative to the housing. Since the angular position of selector sleeve 50 relative to housing 5 is controllable, indicia (e.g. trademarks, trade names, logos or other indicia) which appears on the handle can be reliably aligned with indicia which appears on the selector sleeve.

Figure 14:
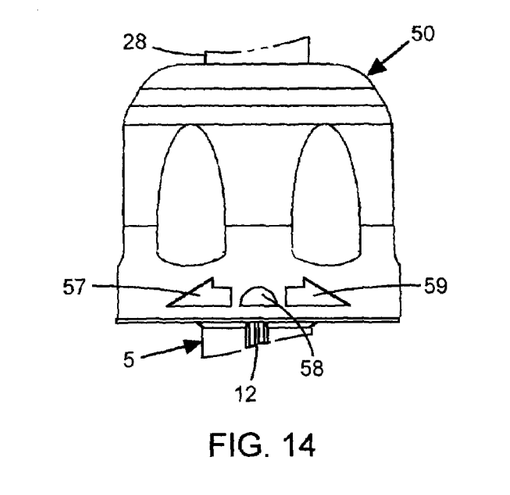
FIG. 14 is an enlarged elevation view, partially cut-away, of a lower part of the embodiment shown in FIG. 1, and which highlights directional markings on the selector sleeve of the embodiment.

Preferably, but not essentially, the indicia which appears on selector sleeve 50 at least includes directional markings. As best seen in FIG. 14, these markings include a marking 57 which designates the direction of movement of sleeve 50 for setting clockwise ratcheting operation (viz. a first mode of operation), a marking 59 which designates the direction of movement of sleeve 50 for setting anti-clockwise ratcheting operation (viz. a second mode operation), and a marking 58 which designates the position of sleeve 50 to enable non-ratcheting operation (viz. a third mode of operation) where ratcheting behaviour is disabled.

Figure 1:
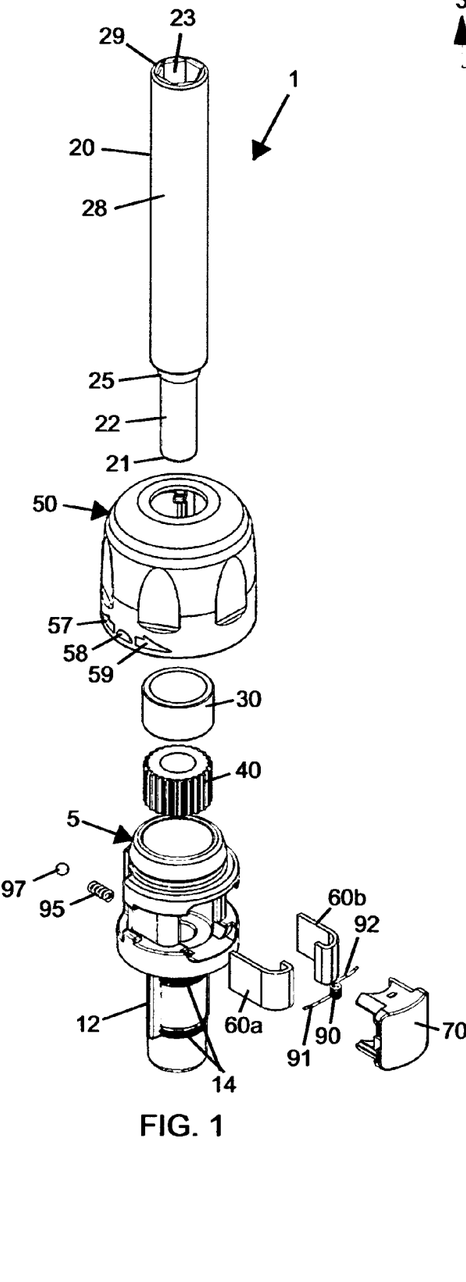
FIG. 1 is an exploded isometric view of a first embodiment of a drive mechanism in accordance with the present invention.
Figure 2:
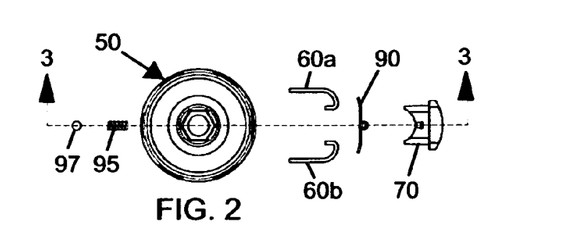
FIG. 2 is a top view of the exploded view shown in FIG. 1.
Figure 3:
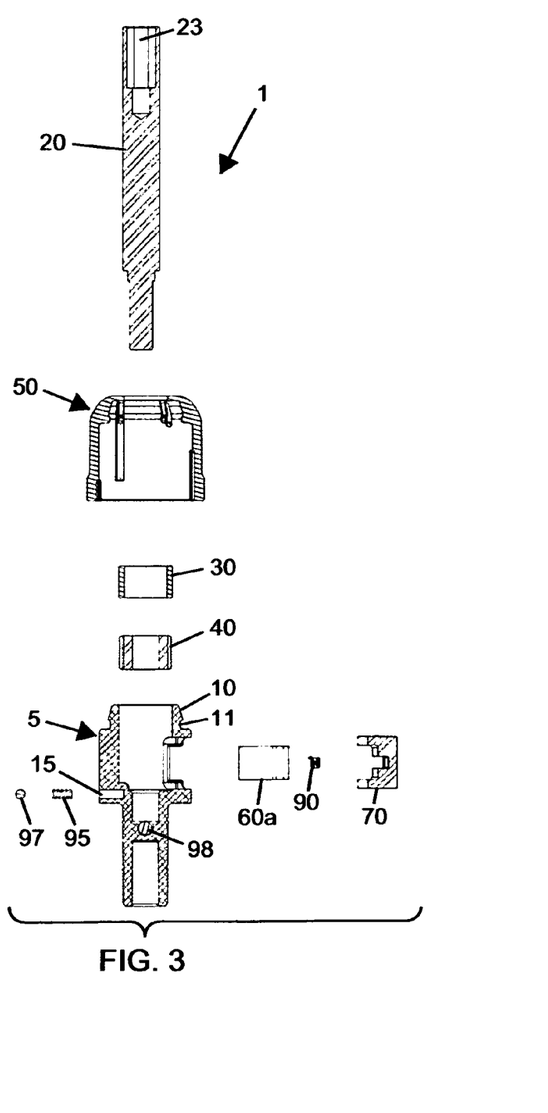
FIG. 3 is a section elevation view taken along section line 3-3 in FIG. 2.
Figures 4, 5:
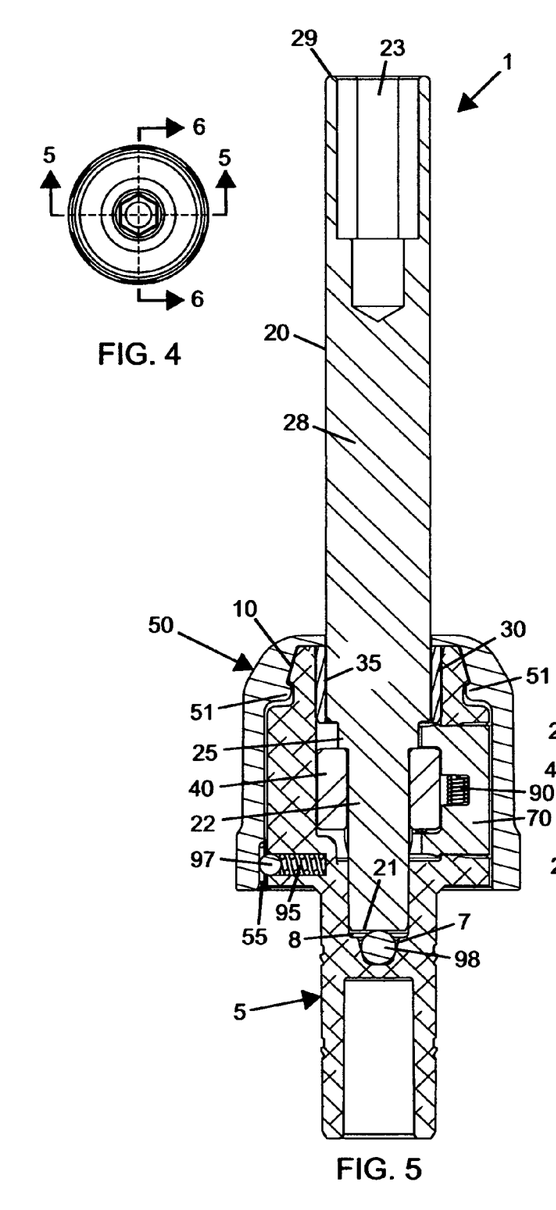
FIG. 4 is a top view of the embodiment shown in FIG. 1 when the embodiment is in an assembled condition.
FIG. 5 is a section elevation view taken along section line 5-5 in FIG. 4
Figure 6:
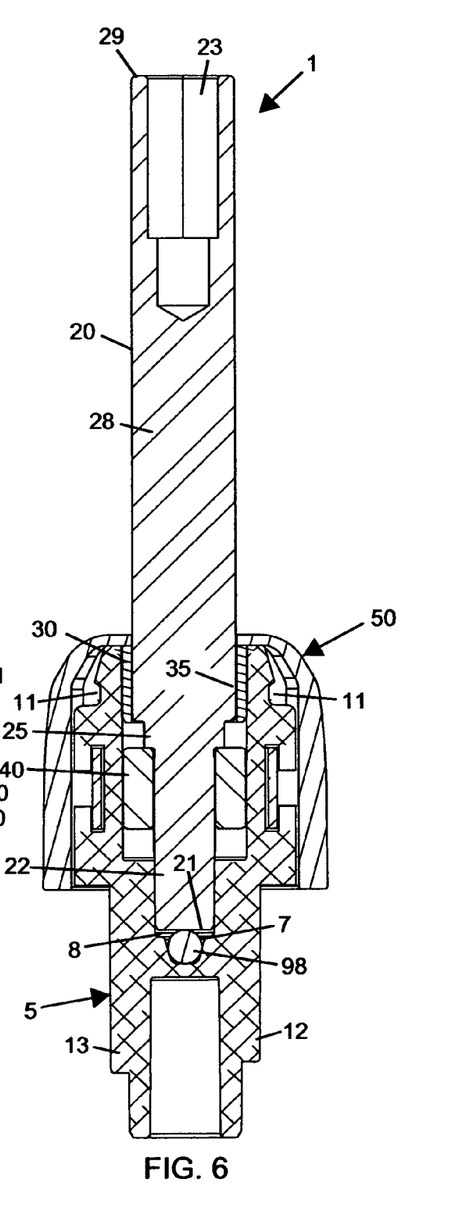
FIG. 6 is a section elevation view taken along section line 6-6 in FIG. 4.
Figure 9:
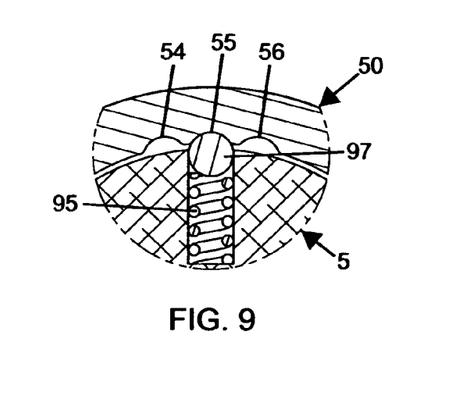
FIG. 9 is a sectional view, partially cut-away, taken in a plane below the sectional view shown in FIG. 8.
Figure 12:
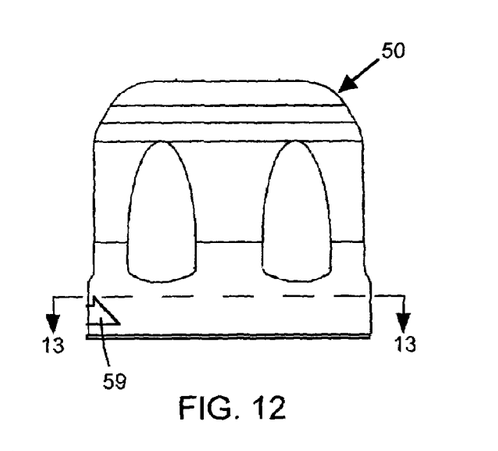
FIG. 12 is a side elevation view of the selector sleeve forming part of the embodiment shown in FIG. 1.
Figure 13:
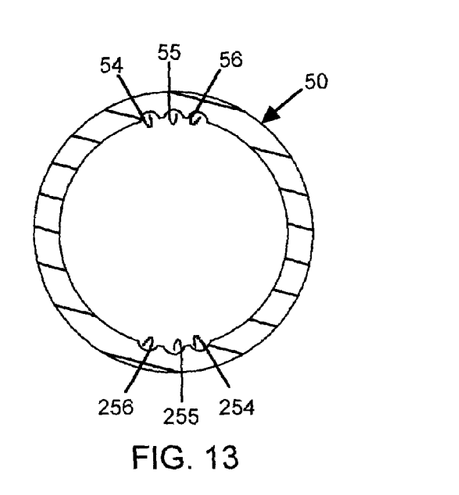
FIG. 13 is a sectional view taken along section line 13-13 in FIG. 12.

As best seen in FIGS. 5 and 9, selector spring 95 is a compression spring seated in a cylindrical recess 15 in housing 5 and serves to urge selector ball 97 into a selected one of three recesses 54, 55, 56 in the lower inner wall of selector sleeve 50 (see also FIGS. 12 and 13). In the central position shown in FIGS. 5 and 9, ball 97 is urged into recess 55 where non-ratcheting operation is enabled. If selector sleeve 50 is rotated anti-clockwise from the position shown in FIG. 9, then ball 97 will be urged into recess 56 where clockwise ratcheting operation is enabled. Conversely, if selector sleeve 50 is rotated clockwise from the position shown FIG. 9, then ball 97 will be urged into recess 54 where anti-clockwise ratcheting operation is enabled.

Figure 8:
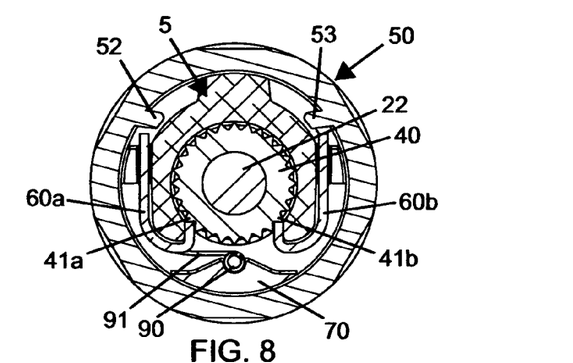
FIG. 8 is a sectional view taken along section line 8-8 in FIG. 7, and which shows a non-ratcheting positioning of the parts shown in FIG. 1.
Figure 15:
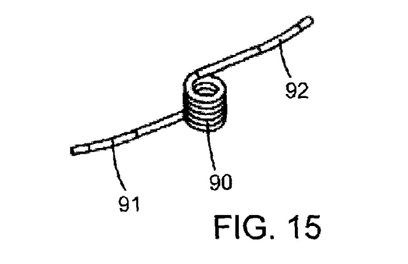
FIG. 15 is an enlarged isometric view of coil spring 90 shown in FIGS. 1, 5 and 8-11.
Figure 16:
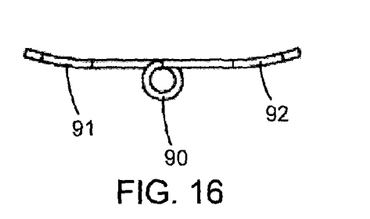
FIG. 16 is a top view of the spring shown in FIG. 15.

In more detail, retaining clip 70 holds coil spring 90 (best seen in FIGS. 15-16) in a position where its arms 91, 92 bear against pawls 60a, 60b thereby urging the pawls substantially linearly towards ratchet wheel 40. When selector sleeve 50 is centrally positioned for non-ratcheting operation then, as shown in FIG. 8, pawl 60a is urged into abutment with tooth 41a of ratchet wheel 40 and pawl 60b is urged into abutment with tooth 41b of the ratchet wheel. This effectively disables ratcheting operation because ratchet wheel 40 cannot advance either clockwise or anti-clockwise.

Figure 10:
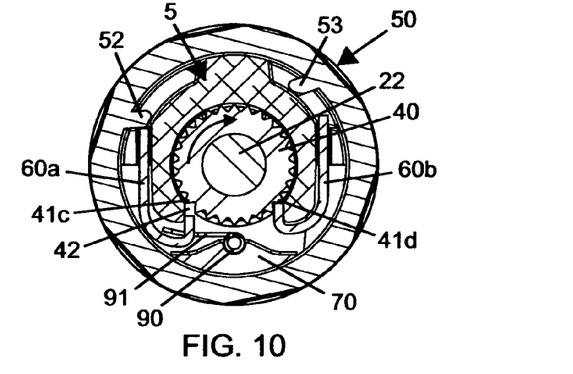
FIG. 10 is a sectional view similar to that shown in FIG. 8, but wherein the parts have been relatively rotated from the non-ratcheting position shown in FIG. 8 to enable ratcheting action in a clockwise direction.

In contrast, when selector sleeve 50 is rotated anti-clockwise relative to housing 5 to the position shown in FIG. 10 then, acting against the bias of spring arm 91, tab 52 projecting inwardly from the inner wall of the selector sleeve forcibly pushes and disengages pawl 60a substantially linearly away from ratchet wheel 40 (note the gap 42 between pawl 60a and tooth 41c of the ratchet wheel). Meanwhile, pawl 60b is urged by spring arm 92 (not visible in FIG. 10) into abutment with tooth 41d of the ratchet wheel. In this position, which is secured by the engagement between selector ball 97 and recess 56 in sleeve 50, ratcheting operation in a clockwise direction is enabled (e.g. the tightening of right hand screws is enabled).

Figure 11:
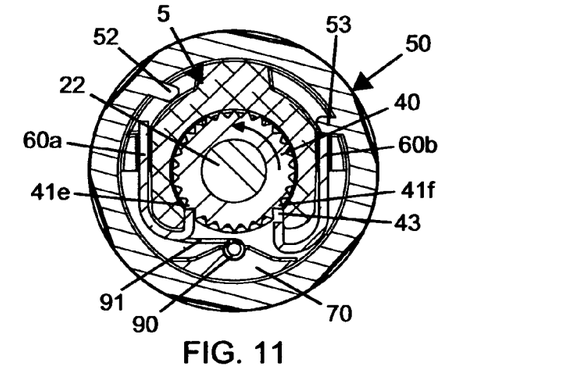
FIG. 11 is a sectional view similar to that shown in FIG. 8, but wherein the parts have been relatively rotated from the non-ratcheting position shown in FIG. 8 to enable ratcheting action in an anti-clockwise direction.

Conversely, when selector sleeve 50 is rotated clockwise relative to housing 5 to the position shown in FIG. 11 then, acting against the bias of spring arm 92 (not visible in FIG. 11), tab 53 projecting inwardly from the inner wall of the selector sleeve forcibly pushes and disengages pawl 60b substantially linearly away from ratchet wheel 40 (note the gap 43 between pawl 60b and tooth 41f of the ratchet wheel). Meanwhile, pawl 60a is urged by spring arm 91 into abutment with tooth 41e of the ratchet wheel. In this position, which is secured by the engagement between selector ball 97 and recess 54 in sleeve 50, ratcheting operation in an anti-clockwise direction is enabled (e.g. the loosening of right hand screws is enabled).

Figure 17:
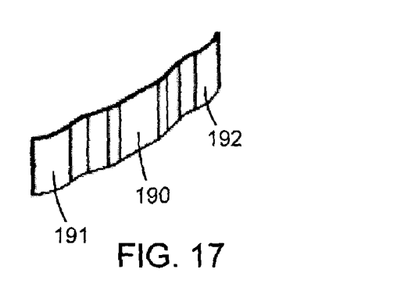
FIG. 17 is an enlarged isometric view of a leaf spring which may be substituted to perform the function of coil spring 90 shown in FIGS. 15-16.
Figure 18:
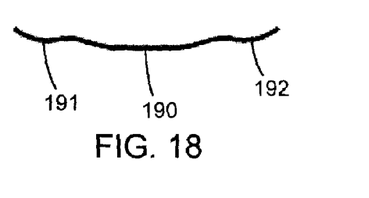
FIG. 18 is a top view of the spring shown in FIG. 17.

It will be apparent to those skilled in the art that the function performed by coil spring 90 can also be performed by other means. For example, a leaf spring 190 with left and right arms 191, 192 as shown in FIGS. 17-18 may be substituted for coil spring 90 with left and right arms 91, 92.

Second Embodiment

In a second embodiment of the present invention, it is contemplated that the means used to perform the function of coil spring 90 in the first embodiment advantageously can also be used to perform the function of selector spring 95 and selector ball 97 in the first embodiment. The result is fewer parts since the need for the selector spring and selector ball is avoided.

Figures 19, 23, 24, 25:
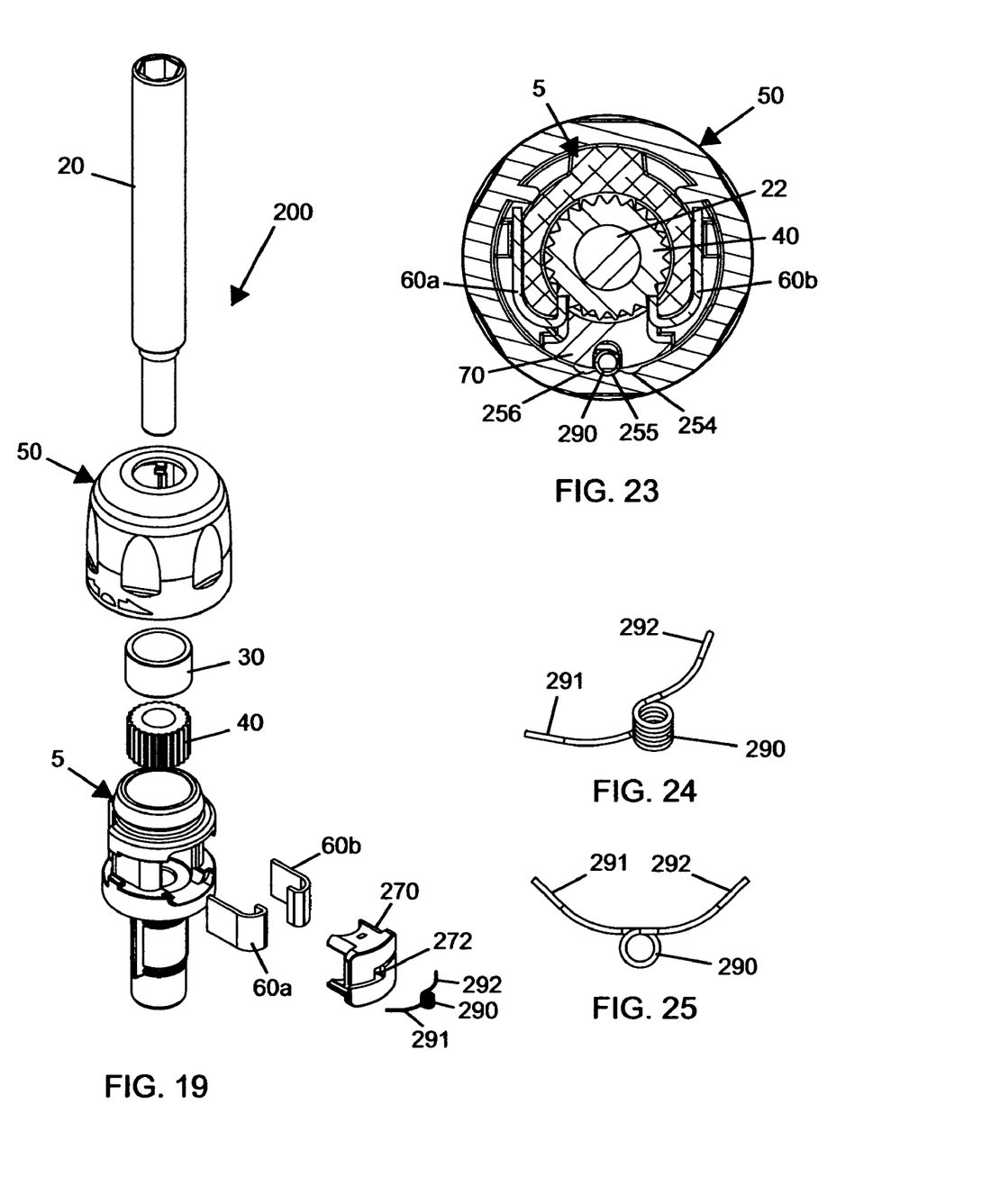
FIG. 19 is an exploded isometric view of a second embodiment of a drive mechanism in accordance with the present invention.
FIG. 23 is a sectional view which shows a non-ratcheting positioning of the parts shown in FIG. 19.
FIG. 24 is an enlarged isometric view of a dual action coil spring shown in FIGS. 19, 21 and 23.
FIG. 25 is a top view of the spring shown in FIG. 24.

In more detail and referring now to FIGS. 19-23, there is shown a ratchet drive mechanism generally designated 200 which is substantially the same as ratchet drive mechanism 1 but for the following differences:

(1) a plastic retaining clip 270 is used instead of retaining clip 70;

(2) a steel dual action coil spring 290 with arms 291, 292 as best seen in FIGS. 24-25 is used instead of coil spring 90;

(3) there is no selector spring or selector ball.

Retaining clip 270 holds spring 290 in a position where its arms 291, 292 bear against pawls 60a, 60b thereby urging the pawls substantially linearly towards ratchet wheel 40. Concurrently, spring action urges the central main body portion of spring 290 outwardly through opening 272 in the outer wall of clip 270 into a selected one of three recesses 254, 255, 256.

Figure 7:
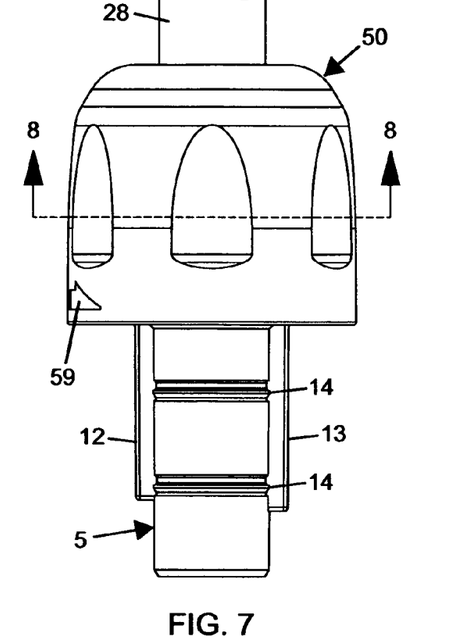
FIG. 7 is an enlarged elevation view of a lower part of the embodiment shown in FIG. 1 when the embodiment is in an assembled condition.
Figures 20, 21:
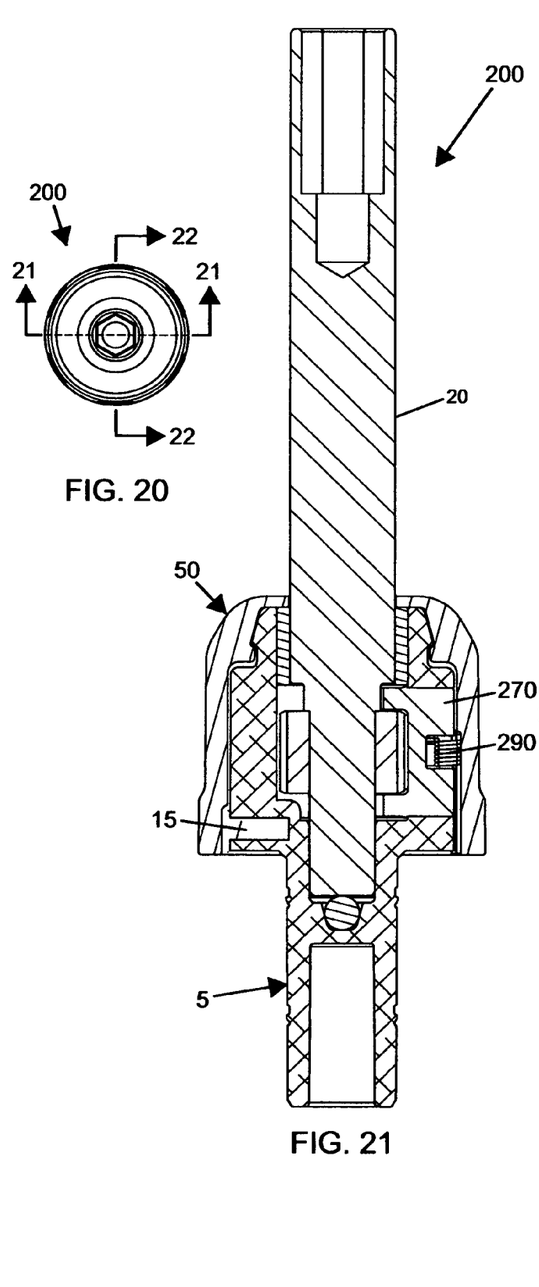
FIG. 20 is a top view of the embodiment shown in FIG. 19 when the embodiment is in an assembled condition.
FIG. 21 is a section elevation view taken along section line 21-21 in FIG. 20
Figure 22:
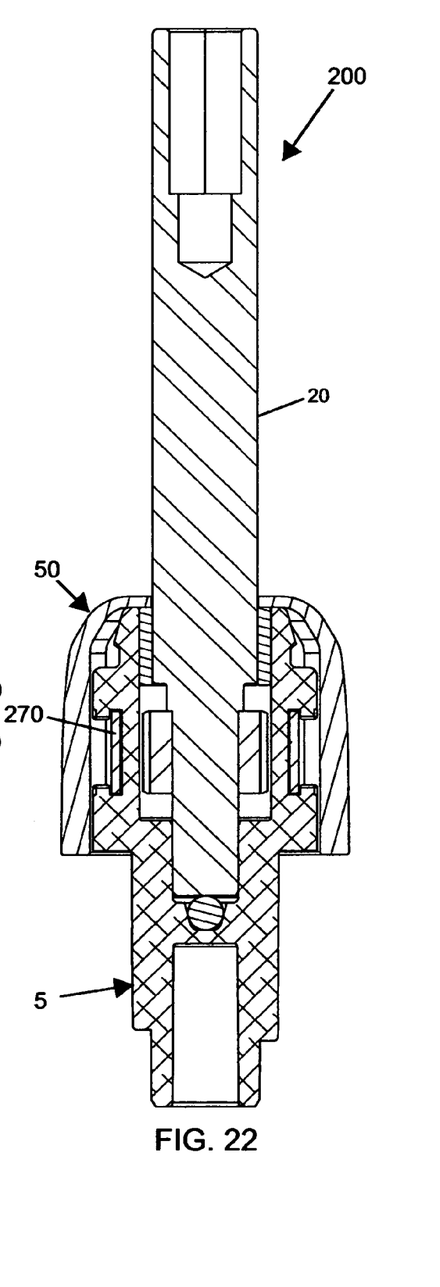
FIG. 22 is a section elevation view taken along section line 22-22 in FIG. 20.

Recesses 254, 255 and 256 are all visible in FIG. 13. FIGS. 21 and 23 show spring 290 urged into recess 255 which is a non-ratcheting position operating essentially as described above with respect to the first embodiment. Parenthetically, it may be noted that FIG. 7 is equally representative of the both the first and second embodiments. The sectional view shown in FIG. 23 may be considered as one taken along section line 8-8 in FIG. 7.

If selector sleeve 50 is rotated anti-clockwise relative to housing 5 from the position shown in FIG. 23, then spring 290 will move from recess 255 into recess 254. This enables ratcheting operation in a clockwise direction in essentially the same manner as described above with respect to the first embodiment. Conversely, if selector sleeve 50 is rotated clockwise relative to housing 5 from the position shown in FIG. 23, then spring 290 will move from recess 255 into recess 256. This enables ratcheting operation in an anti-clockwise direction in essentially the same manner as described above with respect to the first embodiment.

With regard to both embodiments described above, it should be noted that housing 5 and selector sleeve 50 as shown in the drawings have been configured to accommodate either embodiment. Thus, housing 5 includes a cylindrical recess 15 which holds selector spring 95 in the first embodiment, but which is not necessary for the second embodiment. Similarly, selector sleeve 50 includes recesses 54, 55, 56 which are used for the first embodiment, but which are not necessary for the second embodiment. As well, selector sleeve 50 includes recesses 254, 255, 256 which are used for the second embodiment but which are not necessary for the first embodiment.

A variety of modifications, changes and variations to the invention are possible, and will undoubtedly occur to those skilled in the art. The invention should not be considered as restricted to the specific embodiments that have been described and illustrated with reference to the drawings.

The invention claimed is:

1. A three-way ratchet drive mechanism for a work tool which mechanism is settable, selectively, to a desired one of three modes of operation, namely, a first mode of operation where ratcheting operation is enabled in a clockwise direction, a second mode of operation where ratcheting operation is enabled in an anti-clockwise direction, or a third mode of operation where the drive mechanism is locked and ratcheting operation is disabled, said mechanism comprising:
   (a) a ratchet housing (5), said housing including a guide tube (8) formed in the housing;
   (b) a drive shaft (20) extending longitudinally from a proximal end (21) of a first end portion (22) of the shaft to a distal end (29) of a second end portion (28) of the shaft, said first end portion extending into said guide tube, said guide tube being sized for providing lateral bearing support to said first end portion;
   (c) a ratchet wheel (40) coaxially fitted within the housing to the first end portion of the shaft in a position above the guide tube;
   (d) a pawl spring (90, 190, 290) retained within said housing, said spring having first (91,191,291) and second (92, 192, 292) spring arms;
   (e) opposed first (60a) and second (60b) J-shaped ratchet pawls mounted within the housing, each pawl being biased by an associated one of said spring arms substantially linearly towards a position of engagement with the ratchet wheel such that:
      if both pawls are in positions of engagement with the ratchet wheel, then ratcheting operation is disabled;
      else, if only the first pawl (60a) is in a position of engagement with the ratchet wheel, then ratcheting operation is enabled in a first rotational direction;
      else, if only the second pawl (60b) is in a position of engagement with the ratchet wheel, then operation is enabled in a second rotational direction opposite to the first direction;
   (f) a retaining clip (70, 270) for holding said pawl spring in a position where the spring arms bear against said pawls urging the pawls substantially linearly towards said ratchet wheel;
   (g) a selector sleeve (50) coaxially fitted from over the top of the housing for rotational movement relative to the housing in directions corresponding to said first and second rotational directions, said sleeve including first (52) and second (53) tabs projecting into the housing,
      said first tab (52) being positioned to engage and forcibly push said first pawl (60a) substantially linearly away from engagement with said ratchet wheel when the sleeve is rotated against the bias of said first spring arm;
      said second tab (53) being positioned to engage and forcibly push said second pawl (60b) substantially linearly away from engagement with said ratchet wheel when the sleeve is rotated against the bias of said second spring arm;
   and,
   (h) selector sleeve retaining means for retaining the selector sleeve in a rotational position relative to the housing which corresponds to a desired one of said three modes of operation.

2. A ratchet drive mechanism as defined in claim 1, further including a bearing sleeve (30) axially aligned with and longitudinally spaced from said guide tube (8), said bearing sleeve being sized for providing lateral bearing support to said second end portion (28) of the drive shaft (20).

3. A ratchet drive mechanism as defined in claim 2, wherein said bearing sleeve (30) is fitted to the housing (5) within said selector sleeve (50).

4. A ratchet drive mechanism as defined in claim 1, 2 or 3, further including a shaft bearing (98) abutting said proximal end (21) of the drive shaft (20).

5. A ratchet drive mechanism as defined in claim 1, 2 or 3, wherein said pawl spring is a compression spring (90, 290).

6. A ratchet drive mechanism as defined in claim 1, 2 or 3, wherein said pawl spring is a leaf spring (190).

7. A ratchet drive mechanism as defined claim 1, 2 or 3, wherein said selector sleeve retaining means comprises:
   (a) circumferentially spaced recesses (54, 55, 56) located in an inner wall of said selector sleeve (50), each of said recesses being associated with a unique one of said three modes of operation;
   (b) a selector ball (97); and,
   (c) a selector spring (95) seated in a recess (15) in said housing (5) for urging said ball into a selected one said recesses.

8. A ratchet drive mechanism as defined in claim 1, 2 or 3, wherein:
   (a) said spring (290) is a compression spring retained within said housing (5) by a retaining clip (270) which has an opening (272) through which a central main body portion of said spring (290) is outwardly urged by said spring; and,
   (b) said selector sleeve retaining means comprises circumferentially spaced recesses (254, 255, 256) located in an inner wall of said selector sleeve (50), each of said recesses being associated with a unique one of said three modes of operation, and each being sized to engage said main body portion depending on the selected mode of operation.

9. A ratchet drive mechanism as defined in claim 1, 2 or 3, wherein a lower part of said housing (5) has differently sized splines (12, 13) adapted to engage a screwdriver handle when press fitted to the mechanism, such splines permitting the handle to be fitted to the housing in only one angular position relative to the housing.

10. A ratchet drive mechanism as defined in claim 1, 2 or 3, wherein said drive shaft (20) has a radially stepped cylindrical configuration, said first end portion (22) having a diameter less than the diameter of said second end portion (28).

\* \* \* \* \*